United States Patent
Ishii et al.

(10) Patent No.: US 6,925,727 B2
(45) Date of Patent: Aug. 9, 2005

(54) DIAL-DISPLAY MEASURING TOOL AND ONE-REVOLUTION DIAL GAUGE

(75) Inventors: Munenori Ishii, Nakatsugawa (JP); Toshiyuki Shinohara, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/819,232

(22) Filed: Apr. 7, 2004

(65) Prior Publication Data

US 2004/0200088 A1 Oct. 14, 2004

(30) Foreign Application Priority Data

Apr. 11, 2003 (JP) ........................................ 2003-108082

(51) Int. Cl.[7] .............................................. G01B 3/22
(52) U.S. Cl. .............................. 33/832; 33/556; 33/559
(58) Field of Search ........................ 33/501.05, 501.08, 33/832, 833, 556, 559, 542, 272

(56) References Cited

U.S. PATENT DOCUMENTS

| | | | | |
|---|---|---|---|---|
| 1,966,424 A | * | 7/1934 | Ames ........................... | 33/556 |
| 2,771,684 A | * | 11/1956 | Stromberg et al. ............ | 33/559 |
| 2,834,115 A | * | 5/1958 | Bachmann ..................... | 33/556 |
| 3,046,931 A | * | 7/1962 | Beer ........................... | 116/292 |
| 3,664,292 A | * | 5/1972 | Sherman ....................... | 33/355 R |
| 3,721,010 A | * | 3/1973 | Ristow ......................... | 33/556 |
| 4,204,334 A | * | 5/1980 | Dela Cruz ..................... | 33/391 |
| 4,527,336 A | * | 7/1985 | Mizuno et al. ................. | 33/556 |
| 4,528,755 A | * | 7/1985 | Kanda et al. .................. | 33/559 |
| 4,899,453 A | * | 2/1990 | Bhat et al. .................... | 33/272 |
| 5,276,976 A | * | 1/1994 | Hawkes ........................ | 33/832 |
| 5,682,682 A | * | 11/1997 | Renfrew et al. ................ | 33/556 |

FOREIGN PATENT DOCUMENTS

| JP | A 62-34241 | 9/1987 |
|---|---|---|
| JP | A 2002-048502 | 2/2002 |

* cited by examiner

*Primary Examiner*—Christopher W. Fulton
*Assistant Examiner*—Madeline Gonzalez
(74) *Attorney, Agent, or Firm*—Oliff & Berridge, PLC

(57) ABSTRACT

Since a dial face (3) and an area indicator (4) are formed separately to be independently turnable, the area indicator (4) is not rotated even when the dial face (3) is rotated. With this arrangement, the area indicator (4) can indicate a correct area regardless of the rotated position of the dial face (3), thereby preventing measurement errors. Further, since the area indicator (4) is not included in the dial face (3), the dial face (3) can be shared as a standard dial face.

6 Claims, 10 Drawing Sheets

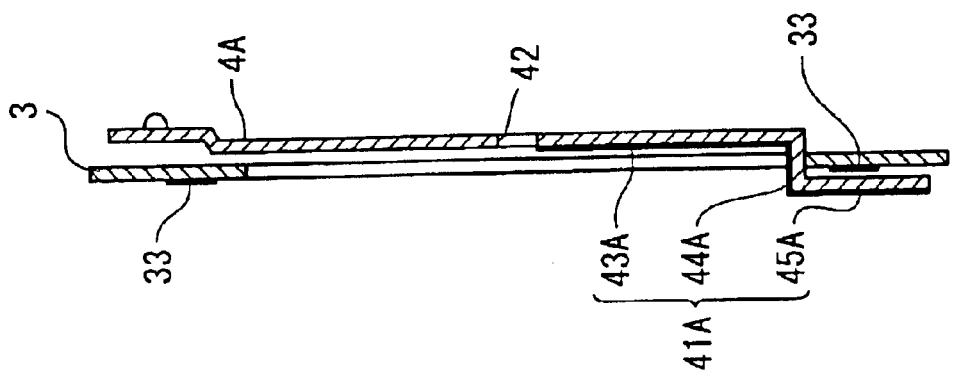
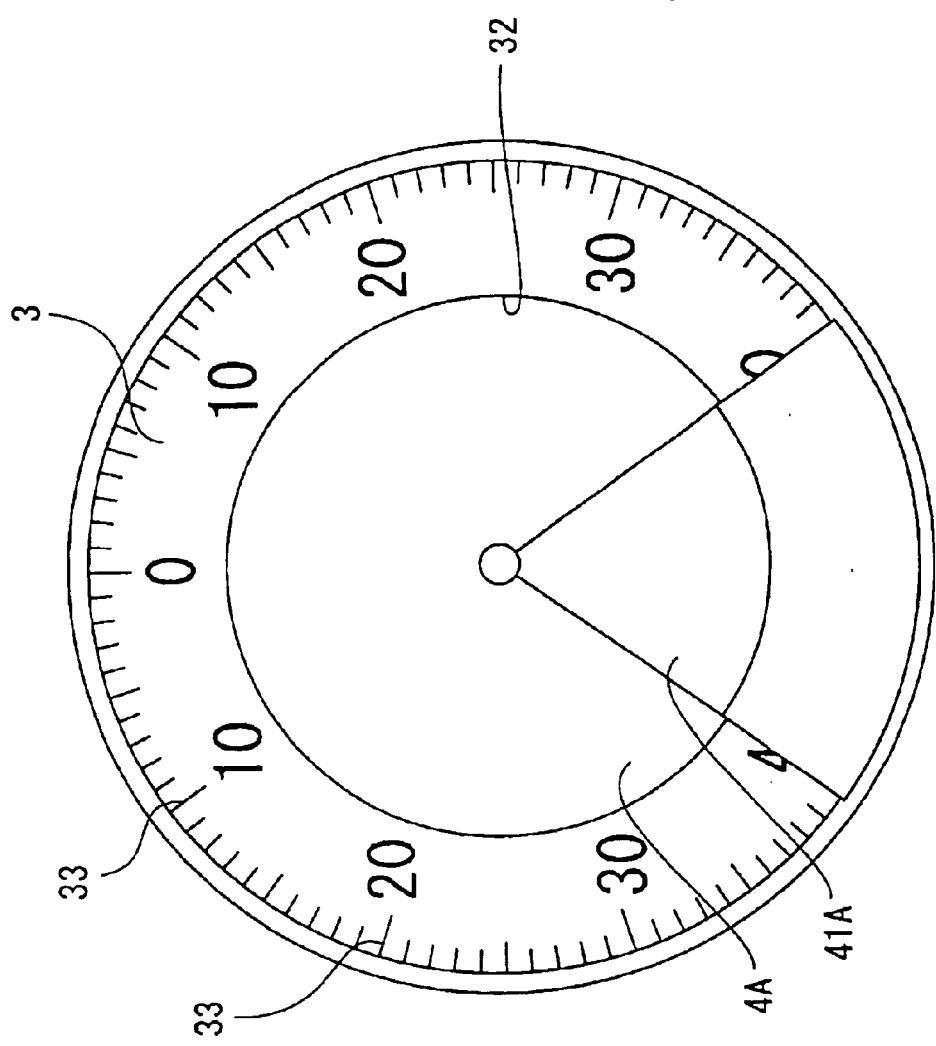

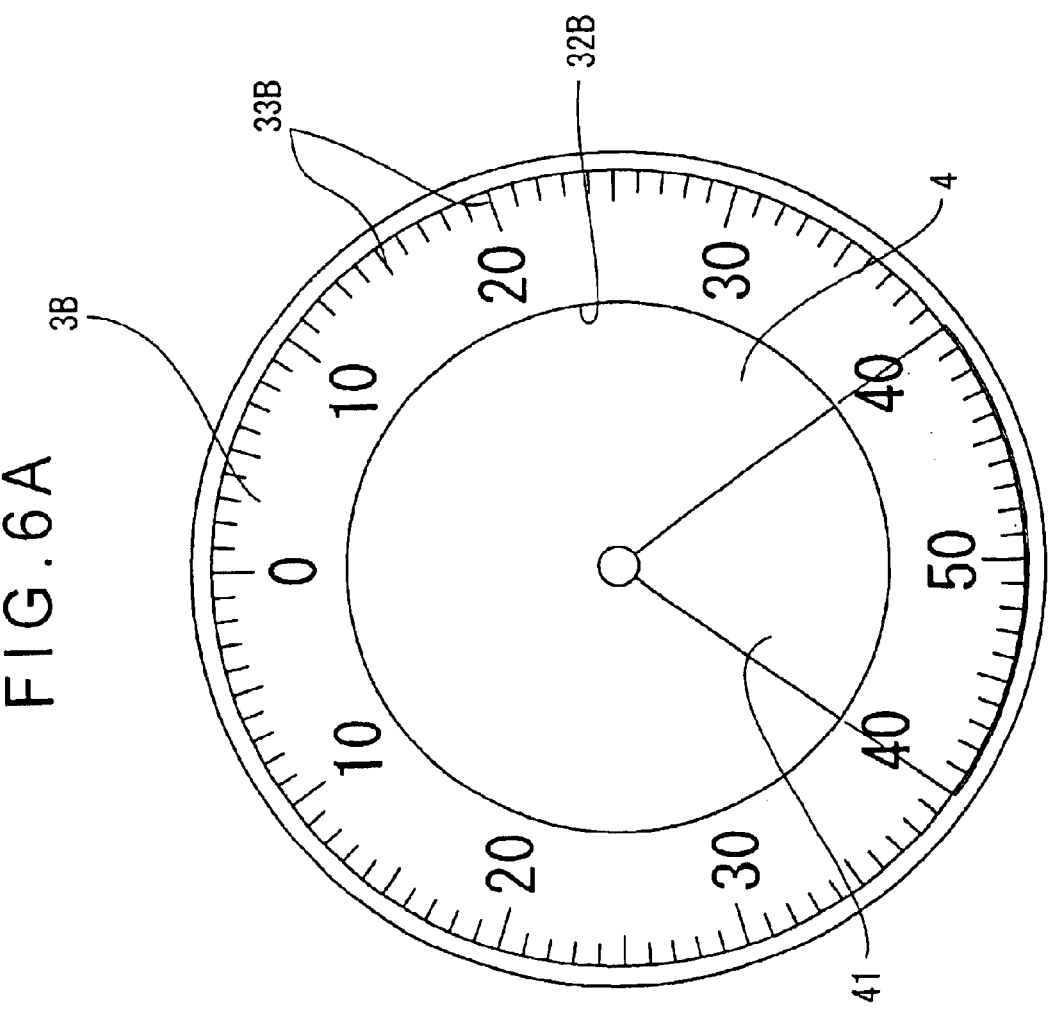

DIAL-DISPLAY MEASURING TOOL AND ONE-REVOLUTION DIAL GAUGE

BACKGROUND OF THE INVENTION

1. Field of the Invention

The present invention relates to a dial-display measuring tool using a dial-type display.

2. Description of Related Art

Various measuring tools use a dial display to output measurement results of the measuring tools. A wide variety of measuring tools of dial-display are available for different measurement purposes and different workpieces. A dial gauge, which is one of such tools, is a dimension measuring tool to read a dimension of a workpiece based on a rotation amount of its pointer. The dial gauge is widely used as it may be attached to a measurement stand or installed into a jig or a testing tool, and it has a large variety to serve different applications. Particularly, a one-revolution dial gauge is useful for comparative measurements since users rarely make a mistake in reading the rotation amount of the pointer.

An example of a conventional one-revolution dial gauge is illustrated in Japanese Laid-open utility model publication No. Sho 62-34241 and FIGS. 8 to 10.

FIG. 8 is an exploded perspective view showing the example of the conventional one-revolution dial gauge. In FIG. 8, the one-revolution dial gauge 100 includes a gauge body 10, a dial face 130 provided on a base plate 12 of the gauge body 10 with a leaf spring 7 interposed therebetween, a pointer 5 attached to the centre of the gauge body 10, and a bezel 160 covering the dial face 130 and the pointer 5.

The gauge body 10 includes a cylindrical casing and axially slidably supports a spindle 2 passing through the gauge body 10, the spindle 2 having a contact point 21 at an end thereof. The spindle 2 and the contact point 21 constitute a probe. The pointer 5, which is arranged at the center of the base plate 12 of the gauge body 10, rotates in response to a movement of the contact point 21 of the spindle 2. The bezel 160 is attached to the gauge body 10 to cover the dial face 130 and the pointer 5.

FIG. 9 is an enlarged view showing the dial face 130 in the conventional art. In FIG. 9, the dial face 130 has graduations 133 arranged at regular circumferential intervals and a dead zone 134 indicating an area where measurement accuracy is not assured. Further, the dial face 130 has a notch 131 while the bezel 160 has a projection 162 at a position matching the notch 131. The projection 162 is fitted into the notch 131 so that the dial face 130 is fixed to the bezel 160 not to be rotated separately.

The leaf spring 7 biases the dial face 130 toward the bezel 160 for avoiding errors in reading measurements due to a misalignment of the dial face 130.

A pointer attachment process, which is a process to attach the pointer 5 onto a pointer shaft 11, included in a production process of the one-revolution dial gauge 100 is descried with reference to FIG. 10. In the conventional one-revolution dial gauge 100, the leaf spring 7 interposed between the dial face 130 and the base plate 12 keeps the dial face 130 shaky and unstable. Because of this, in positioning the dial face 130, a temporary bezel 8 without a cover plate is set on the gauge body 10. Then a projection 81, which is formed in advance in the temporary bezel 8, is fitted into the notch 131 of the dial face 130 to fix the dial face 130, and thereafter the pointer 5 is attached. Once the pointer 5 is attached, the temporary bezel 8 is removed and the bezel 160 is set thereon.

In use of such one-revolution dial gauge 100 of the conventional art, users occasionally rotate the dial face 130 to change the measurement orientation. If the bezel 160 is rotated, the dead zone 134, which is integrally formed on the dial face 130, is rotated together with the dial face 130. In this situation, when the pointer 5 points within the area of non-assured measurement accuracy but not indicated by the dead zone 134, the users might read an incorrect graduation. Also, an area of assured measurement accuracy might be indicated by the dead zone 134. To avoid human errors due to these, some solution is required.

Further, since the dead zone 134 is integrally formed with the dial face 130, the dial face 130 is used only for the one-revolution dial gauge and cannot be alternated with dial faces of other standard dial gauges, thus becoming an obstacle to component sharing.

SUMMARY OF THE INVENTION

An object of the present invention is to provide a dial-display measuring tool that can prevent measurement errors when a dial face is rotated and can share its components with other standard measuring tools.

A dial-display measuring tool according an aspect of the present invention includes: a gauge body; a probe attached to the gauge body; a pointer that points a measurement value in response to a movement of the probe and is attached to the gauge body; a dial face showing graduations of measurement values; and an area indicator showing a predetermined range of the graduations, the dial face and the area indicator being independently turnable and separately formed.

According to this dial-display measuring tool of the present invention, since the dial face and the area indicator are formed separately to be independently turnable, the area indicator is not rotated even when the dial face is rotated. With this arrangement, the area indicator can indicate a correct area regardless of the rotated position of the dial face, thereby preventing measurement errors. Further, since the area indicator is not included in the dial face, the dial face is the same type of standard dial faces and can be used as a standard dial face.

Preferably, in the dial-display measuring tool of the present invention, a bezel is turnably attached to the gauge body, and the area indicator is attached to the gauge body. According to this dial-display measuring tool of the present invention, the area indicator is attached to the gauge body and the dial face is attached to the bezel. Since the dial face is fixed to the bezel, a leaf spring, which makes the dial face unstable, is not used at a pointer attachment process and hence a temporary bezel is also unnecessary. Therefore, the pointer can be easily attached.

Preferably, in the dial-display measuring tool of the present invention, a view hole is formed substantially at the center of the dial face to show an approximate center of the area indicator therethrough, and an edge of the area indicator is extended across a rim of the view hole to cover a part of a surface of the dial face.

According to this dial-display measuring tool of the present invention, since a part of the area indicator covers a part of the surface of the dial face, the area indicator has an enlarged visible size and can be easily recognized, thereby preventing errors in reading the graduations such as oversight of the area indicator.

Preferably, in the dial-display measuring tool of the present invention, the dial face is made of transparent material.

According to this dial-display measuring tool of the present invention, since the dial face is made of transparent material, the area indicator is shown without being hidden by the dial face. Therefore, the area indicator is visible even with the dial face, thereby preventing measurement errors due to oversight of the area indicator and the like.

Preferably, in the dial-display measuring tool of the present invention, the dial face is a transparent cover plate provided on an upper face of the bezel.

According to this dial-display measuring tool of the present invention, since the dial face is the transparent cover plate of the bezel, the area indicator is shown without being hidden by the dial face, thereby preventing measurement errors due to mistakes in reading the area indicator. Further, since the dial face serves as the cover plate, the number of components can be reduced.

Preferably, the dial-display measuring tool of the present invention is a one-revolution dial gauge including: the gauge body; the contact point; the pointer; the dial face; and the area indicator, and a dead zone indicating an area where measurement accuracy is not assured is shown on the area indicator.

The one-revolution dial gauge according to the present invention can obtain the above-mentioned advantages, prevent human mistakes and errors, and share its components with other standard dial gauges.

BRIEF DESCRIPTION OF THE DRAWINGS

FIG. 5A is a plan view in a second embodiment;

FIG. 5B is a sectional view showing a center in the second embodiment;

FIG. 6A is a plan view in a third embodiment;

FIG. 6B is a sectional view showing a center in the third embodiment;

DETAILED DESCRIPTION OF PREFERRED EMBODIMENT(S)

Figure 1:
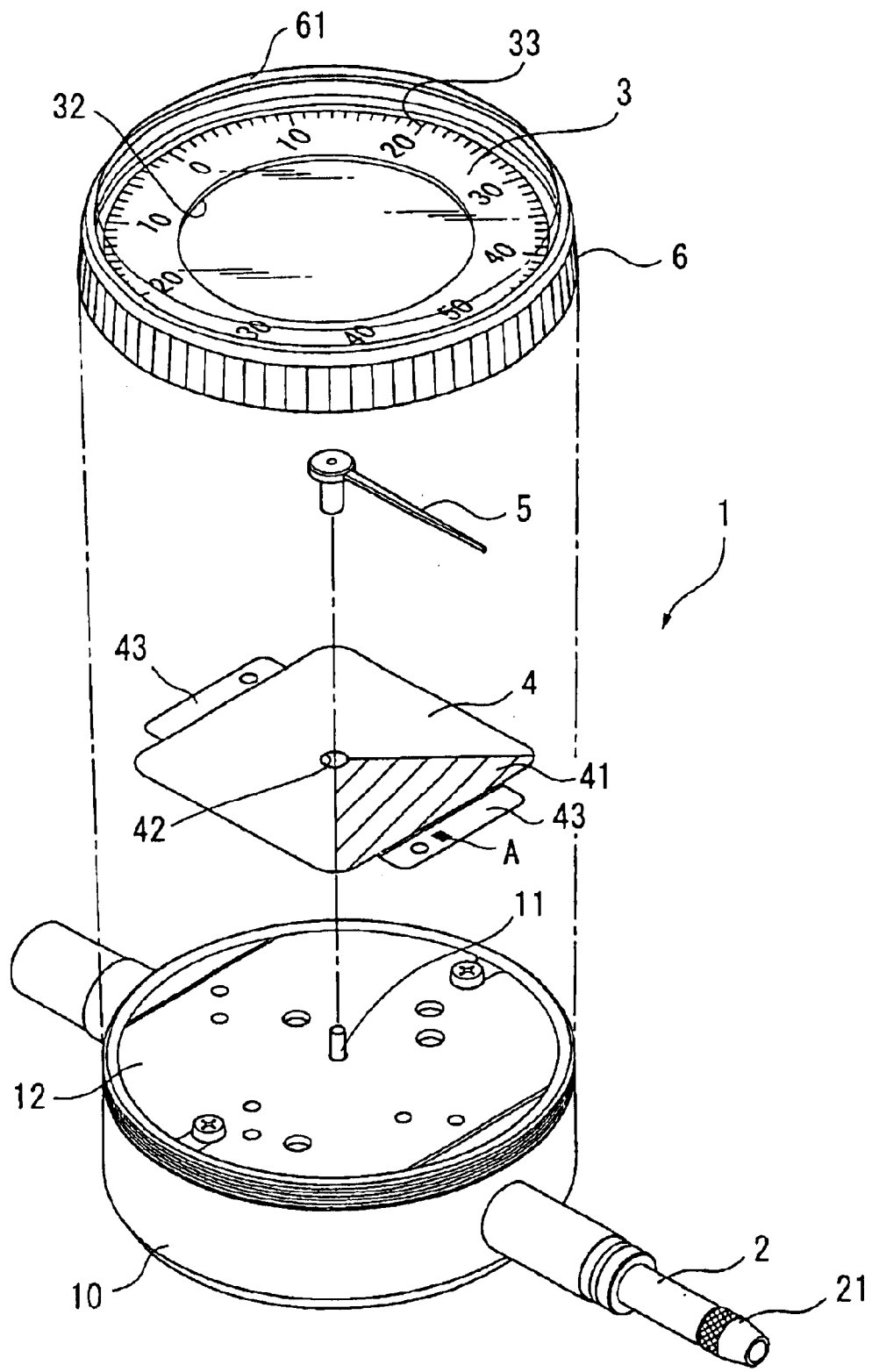
FIG. 1 is an exploded perspective view showing a dial-display measuring tool in a first embodiment of the present invention.

Embodiments in which a dial-display measuring tool according to the present invention is applied to a one-revolution dial gauge will be described with reference to attached drawings. In each embodiment, components identical to or corresponding to those in other embodiments are denoted by the same reference numerals, even if not commented so, to omit or simplify descriptions thereof.

[First Embodiment]

Figure 2:
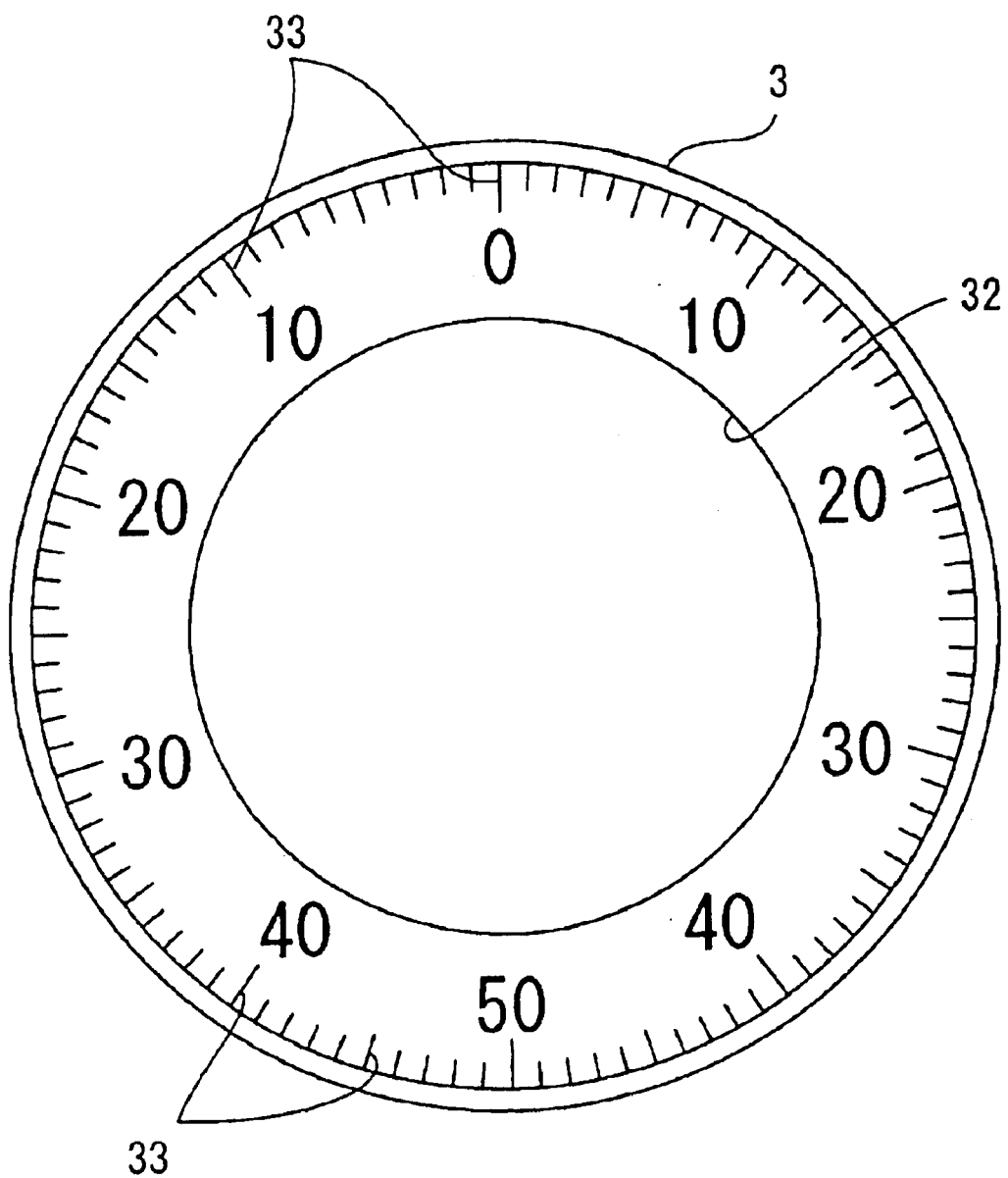
FIG. 2 is an enlarged plan view showing a dial face in the first embodiment.
Figure 3:
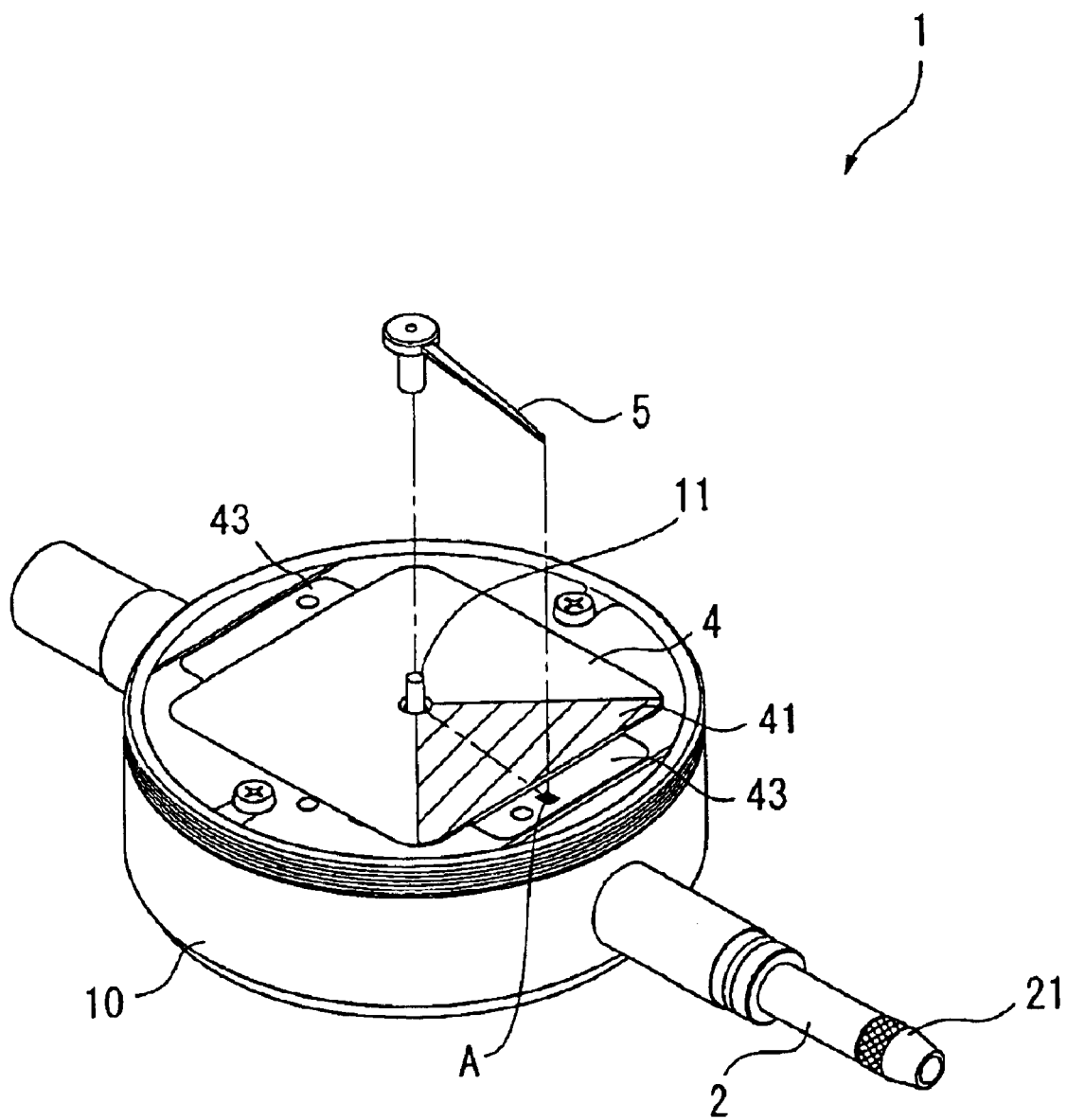
FIG. 3 is an entire perspective view in a pointer attachment process in the first embodiment.
Figure 8:
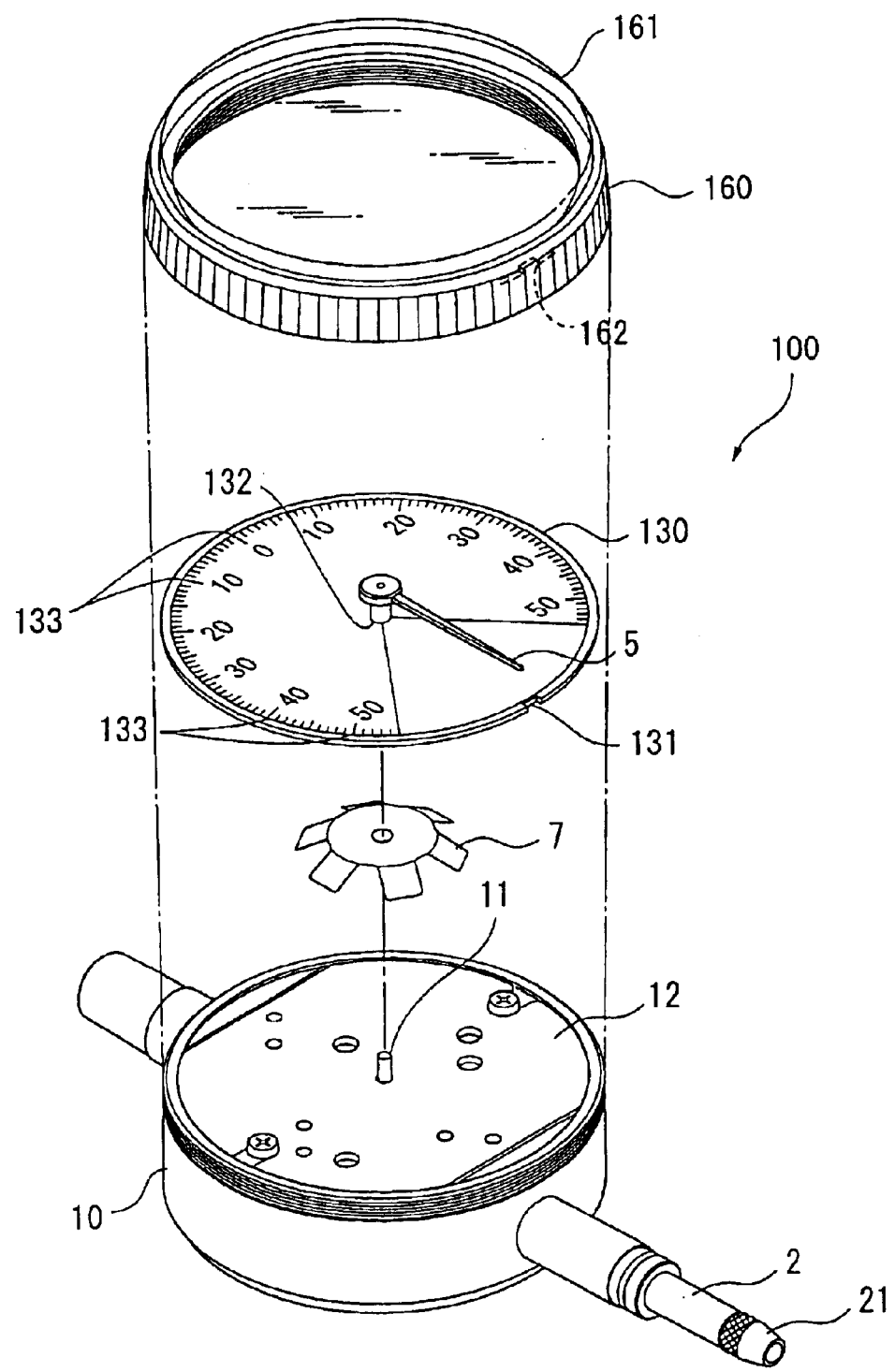
FIG. 8 is an exploded perspective view showing a one-revolution dial gauge in conventional art.
Figure 9:
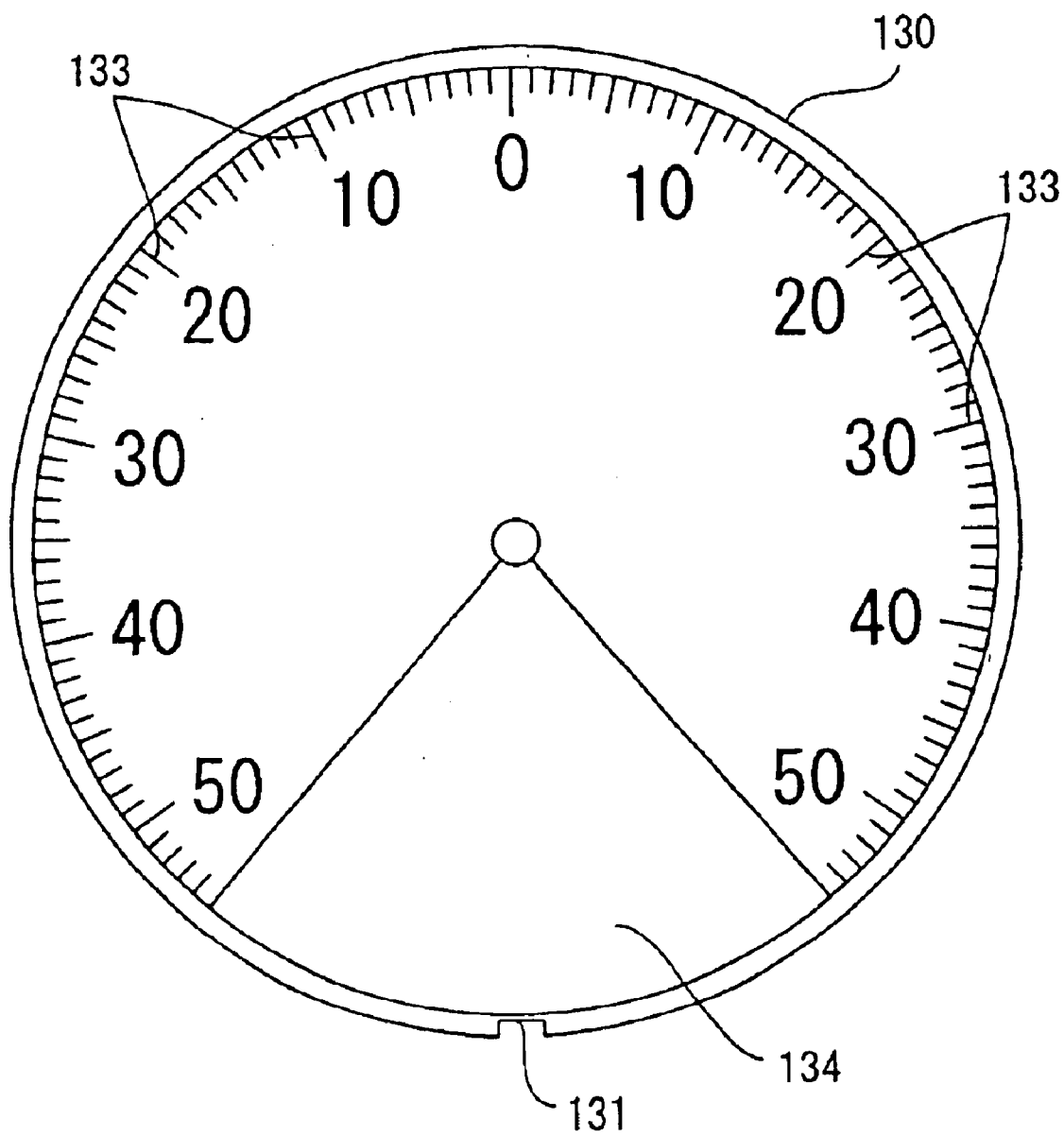
FIG. 9 is an enlarged view showing a dial face in the conventional art.
Figure 10:
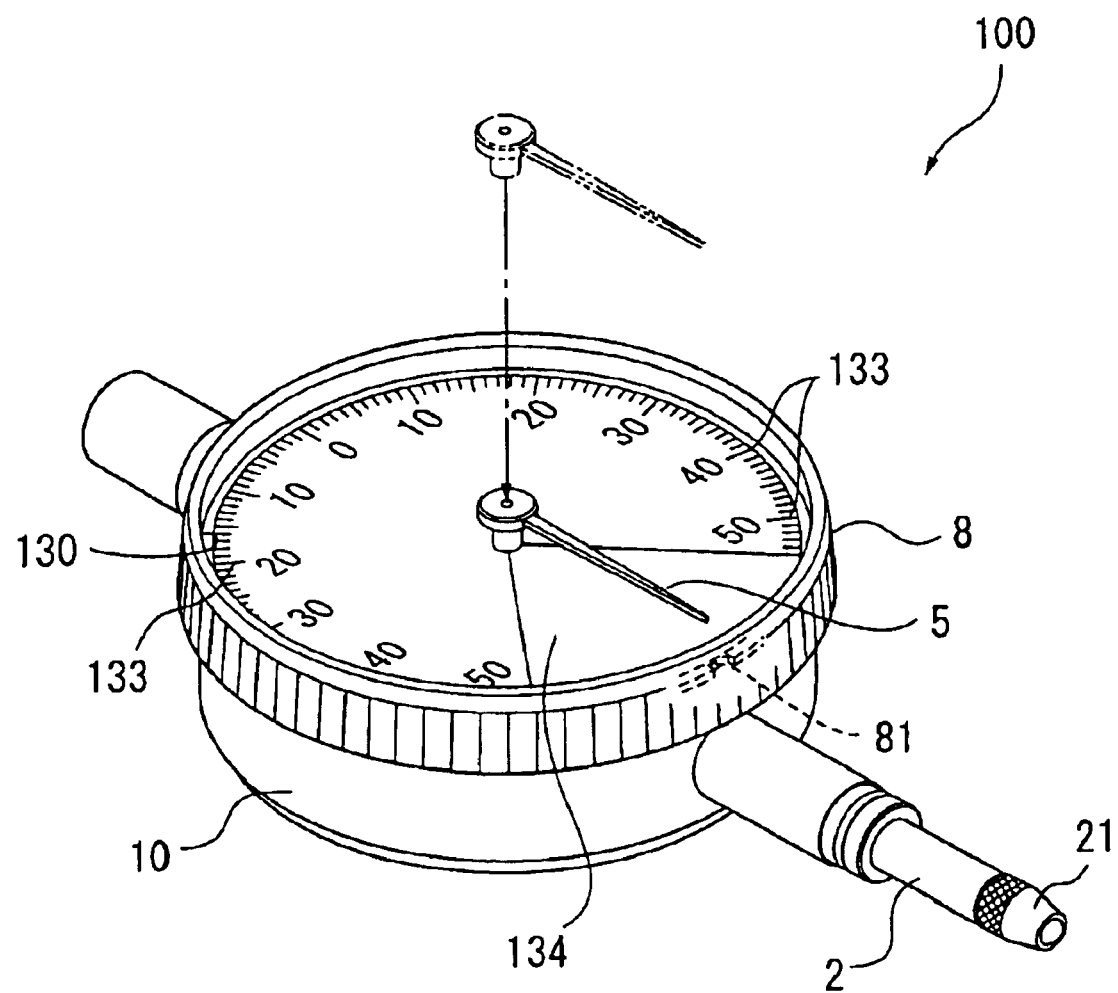
FIG. 10 is an entire perspective view in a pointer attachment process in the conventional art.

In a first embodiment shown in FIGS. 1 to 3, a one-revolution dial gauge is similar to the one in the conventional art shown in FIGS. 8 to 10, and components identical to or corresponding to those in the conventional art are denoted by the same reference numerals to omit or simplify descriptions thereof.

FIG. 1 is an exploded perspective view showing the one-revolution dial gauge, which is a dial-display measuring tool, in the first embodiment.

In FIG. 1, the one-revolution dial gauge 1 includes a gauge body 10, an area indicator 4 that is a substantially rectangular thin plate and provided on a base plate 12 on the upper side of the gauge body 10, a pointer 5 attached onto and fixed to the center of the gauge body 10, a bezel 6 rotatably attached to the gauge body 10, and a dial face 3 attached to the bezel 6.

A pointer shaft 11 is formed at the center of the gauge body 10 to be perpendicular to the base plate 12. The pointer shaft 11 rotates in response to a displacement of a spindle 2. By fixing the pointer 5 to the pointer shaft 11, the displacement of the spindle 2 can be converted to a rotating angle of the pointer 5.

The area indicator 4 is made of lightweight metal material such as stainless and aluminum. A pair of opposite sides of the area indicator 4 respectively have attachment pieces 43, which are fixed to the base plate 12 of the gauge body 10 with a screw or the like, so that the area indicator 4 is attached to the gauge body 10. Within the area indicator 4, a substantially triangular dead zone 41 is formed with two lines extending radially from the center of the gauge body 10 with a predetermined contact angle and a line orthogonal to the axial direction of the spindle 2, the dead zone 41 indicating an area where measurements are not assured in measurement works. The area indicator 4 has a shaft hole 42 at the center thereof, the shaft hole 42 having a diameter slightly larger than that of the pointer shaft 11. The pointer 5 is attached onto the pointer shaft 11 passing through the shaft hole 42.

FIG. 2 is an enlarged view showing the dial face 3. The dial face 3 has graduations 33 at regular circumferential intervals throughout the circumference thereof. The dial face 3 is the same type of a dial face of measuring tools that require graduations throughout the circumference thereof, such as a dial face of a standard dial gauge capable of plural revolutions. The dial face 3 has a view hole 32 with a relatively large diameter at the center thereof, and hence the area indicator 4 positioned under the dial face 3 is visible through the view hole 32.

The dial face 3 is made of lightweight and high-strength material such as stainless and aluminum, and fixed to an inner wall of the bezel 6 by caulking. The bezel 6 has a cover plate 61 on the upper surface thereof. The cover plate 61 is made of transparent material, and hence the area indicator 4 and the pointer 5 arranged inside are visible. The bezel 6 is turnably attached along a circumference of the base plate 12 of the gauge body 10.

FIG. 3 is an illustration showing a part of the pointer attachment process, which is a process to attach the pointer 5 onto the pointer shaft 11, in a production process of the one-revolution dial gauge 1. The pointer 5 is attached onto and fixed to the pointer shaft 11 along a reference line A representing a pointer attachment position. Since the area indicator 4 is fixed to the gauge body 10 and the dial face 3 is fixed to the bezel 6, the leaf spring 7 and the temporary bezel 8 in the conventional art are unnecessary.

In performing measurements with such one-revolution dial gauge 1, a user places a contact point 21 to abut on a workpiece and rotates or moves the workpiece. A displacement of the spindle 2 thus found is converted to a rotation amount in the gauge body 10 and transmitted to the pointer 5, so that the user reads a graduation 33 pointed by the pointer 5 to obtain a measurement value.

Figure 4A:
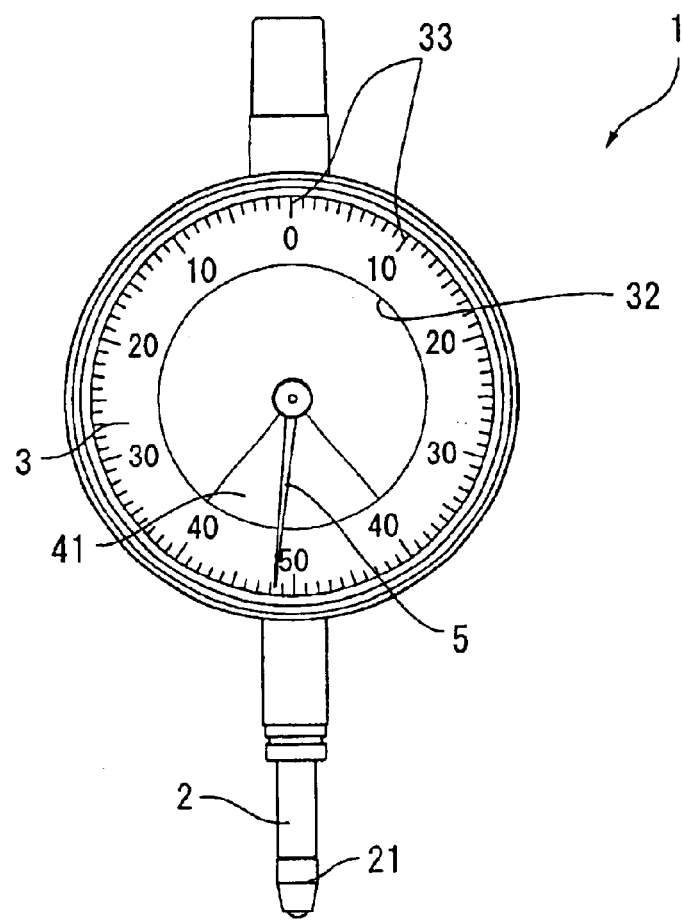
FIGS. 4A and 4B are plan views each showing an area indicator in an orientation in the first embodiment.
Figure 4B:
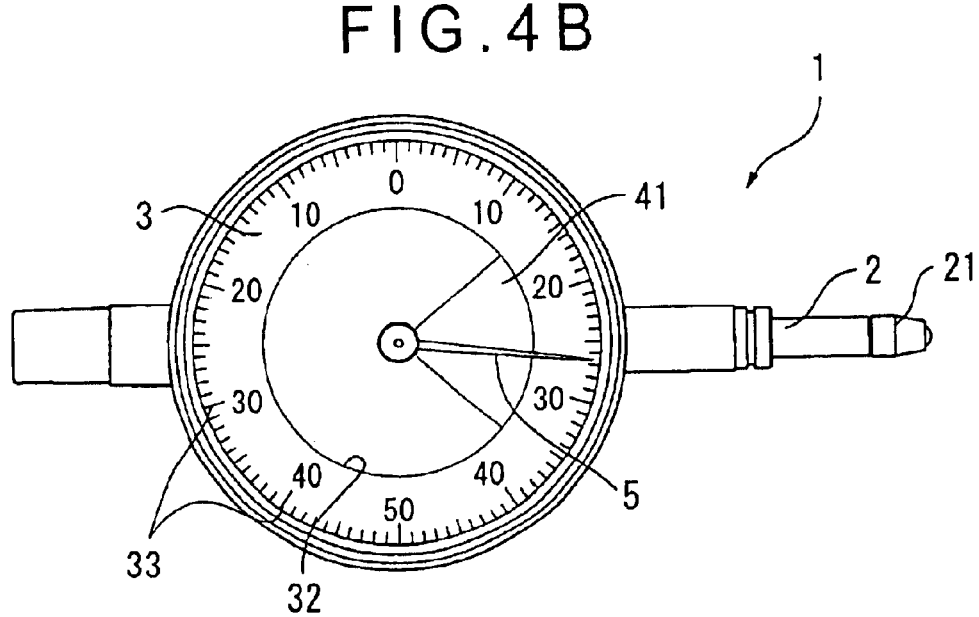

Occasionally, for setting a reference position on a graduation pointed by the pointer 5 when the contact point 21 abuts on the workpiece at the start, the user rotates the bezel 6 to locate a graduation "0" on a position pointed by the pointer 5 at the start. FIG. 4A is a plan view showing the one-revolution dial gauge 1 in which the dial face 3 of the one-revolution dial gauge 1 according to the first embodiment is set so that the graduation "0" is aligned along the axial direction of the spindle 2, and FIG. 4B is a plan view showing the one-revolution dial gauge 1 in which the dial face 3 of the dial gauge 1 of the first embodiment is rotated from the position shown in FIG. 4A so that the graduation "0" is moved. In the conventional one-revolution dial gauge, since the dead zone is fixed to the dial face, the dead zone is rotated together if the dial face is rotated. On the other hand, in the first embodiment as shown in FIGS. 4A and 4B, the area indicator 4 is fixed to the gauge body 10 and hence the dead zone 41 is also fixed thereto. The dead zone 41, which indicates the area where the accuracy is not assured when the pointer 5 is rotated more than a predetermined amount relative to the gauge body 10, is provided in relation to the gauge body 10 and not related to the rotation of the dial face 3. With this arrangement, the dead zone 41 always indicates the correct area even when the dial face 3 is rotated.

The dial-display measuring tool according to the first embodiment has the following advantages.

(1) In the one-revolution dial gauge 1 according to the first embodiment, since the dial face 3 and the area indicator 4 are formed separately to be independently turnable, the area indicator 4 is not rotated even when the dial face 3 is rotated. With this arrangement, the dead zone 41 of the area indicator 4 can indicate the correct area of the dial face 3, thereby preventing measurement errors. Further, since the area indicator 4 is not included in the dial face 3, the dial face 3 is the same type of standard dial faces and has the possibility to be used as a standard component.

(2) Since the area indicator 4 is attached to the gauge body 10 and the dial face 3 is attached to the bezel 6, there is no need to bias the dial face 3 toward the bezel 6, thereby eliminating the necessity of the leaf spring. Further, in the pointer attachment process, since the leaf spring that makes the dial face unstable is not used and hence the temporary bezel 8 is unnecessary, the pointer can be easily attached.

[Second Embodiment]

A second embodiment of the present invention will be described with reference to FIGS. 5A and 5B.

In the one-revolution dial gauge 1 according to the first embodiment, the area indicator 4 is provided on the gauge body 10 and the area indicator 4 is visible only through the view hole 32 of the dial face 3. In the second embodiment, the area indicator 4 is improved to enlarge the visible size of the dead zone for easier recognition.

FIG. 5A is a front view showing a one-revolution dial gauge in the second embodiment, and FIG. 5B is a sectional view showing the center of the one-revolution dial gauge.

In FIGS. 5A and 5B, an area indicator 4A is fixed to a gauge body 10, and a dial face 3 is fixed to a bezel 6. A dead zone 41A of the area indicator 4A are integrally formed with a flat portion 43A, a standing portion 44A formed at an end of the flat portion 43A and extended toward a rim of the view hole 32, and a cover portion 45A extended radially from the standing portion 44A to cover a part of a dial face 3. Since the dead zone 41A covers an upper surface of the dial face 3, the dead zone 41A on the dial face 3 is visually recognizable.

According to the second embodiment, the following advantages can be obtained in addition to the advantages (1) and (2) of the first embodiment.

(3) Since a tip of the dead zone 41A covers a part of the dial face 3, the visible size of the dead zone 41A is enlarged. With this arrangement, the area where the measurement accuracy is not assured is clearly recognizable, thereby preventing users from reading graduations within the area of non-assured measurement accuracy by mistake. Although the area of non-assured measurement accuracy, especially near the edge of the dead zone 41A, is hard to read, measurement errors due to mistakes in reading the graduations can be prevented since the dead zone 41A is displayed over the dial face 3.

[Third Embodiment]

A third embodiment will be descried with reference to FIGS. 6A and 6B.

FIG. 6A is a front view showing a one-revolution dial gauge in the third embodiment, and FIG. 6B is a sectional view showing the center of the one-revolution dial gauge in the third embodiment.

In FIGS. 6A and 6B, configuration of a dial face 3B of the one-revolution dial gauge 1 of the third embodiment is different from that of the first embodiment although other components are the same. In the third embodiment, the dial face 3B is made of transparent material such as glass and transparent plastic, and hence an area indicator 4 provided under the dial face 3B is visible.

According to the third embodiment, the following advantages can be obtained in addition to the advantages (1) and (2) of the first embodiment.

(4) Since the dial face 3B is made of transparent material, the visible size of the dead zone 41 can be enlarged without modifying the area indicator 4 as in the second embodiment, thereby preventing measurement errors due to mistakes in reading the graduations.

[Fourth Embodiment]

A fourth embodiment of the present invention will be described with reference to FIGS. 7A and 7B. In a one-revolution dial gauge according to the fourth embodiment, a position that a dial face is fixed and a material that the dial face is made of are different from those of the first embodiment although other components are the same.

Figure 7B:
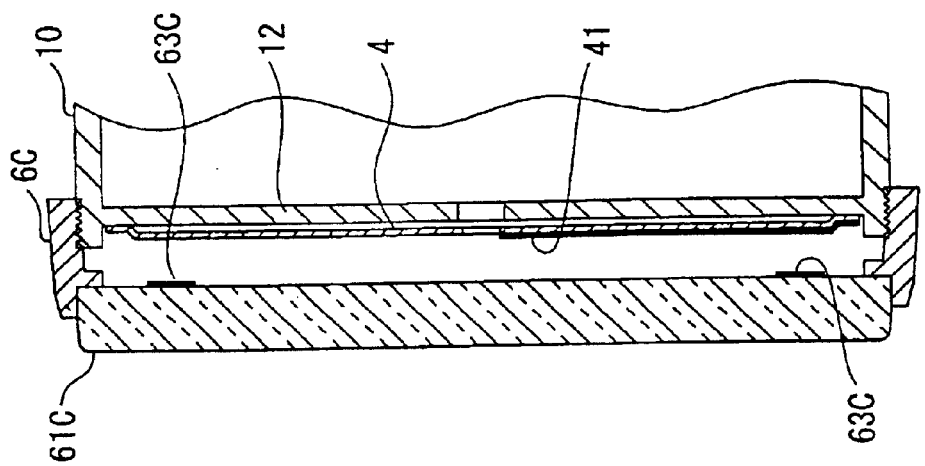
FIG. 7B is a sectional view showing a center in the fourth embodiment.
Figure 7A:
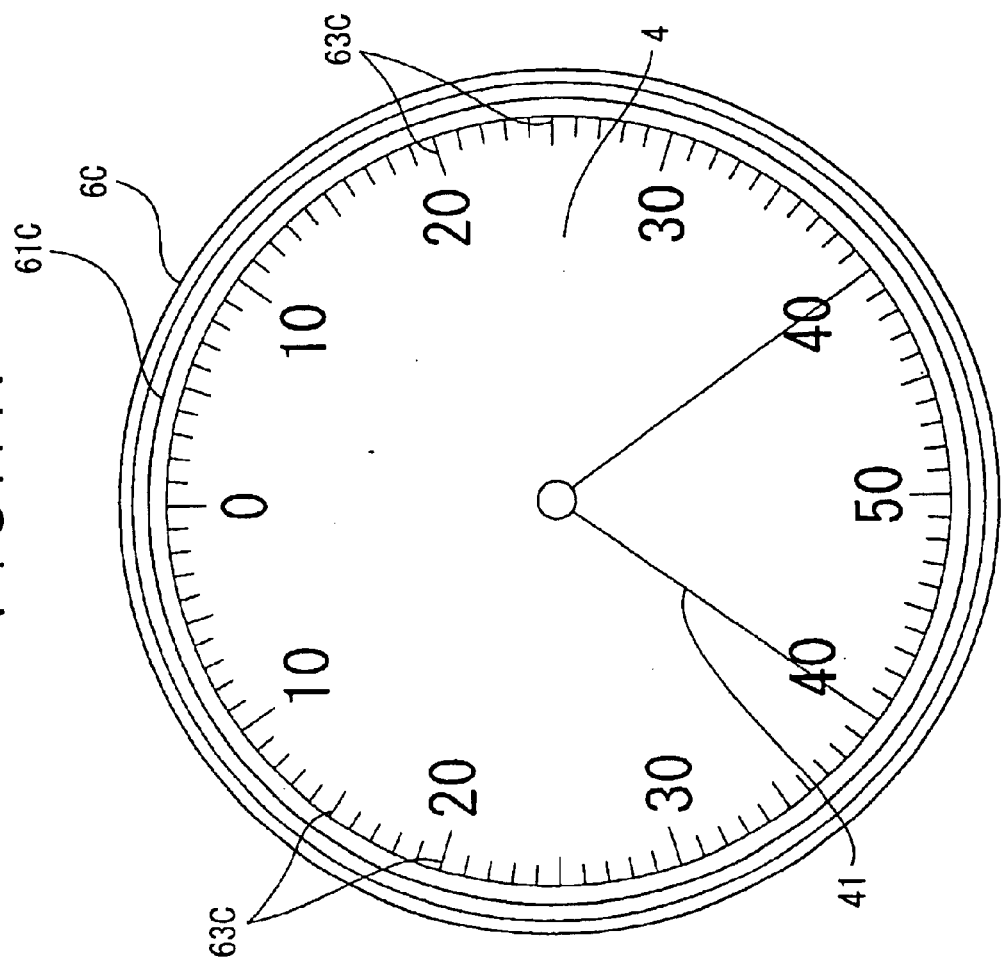
FIG. 7A is a plan view in a fourth embodiment.

FIG. 7A is a front view showing the one-revolution dial gauge in the fourth embodiment, and FIG. 7B is a sectional view showing the center of the one-revolution dial gauge in the fourth embodiment.

In FIGS. 7A and 7B, the one-revolution dial gauge 1 includes a cover plate 61C covering an upper surface of a bezel 6C and serving as a dial face, the cover plate 61C having graduations 63C inscribed or printed on the backside thereof. Since the graduations 63C are formed on the backside of the cover plate 61C, the graduations do not fade while keeping good appearance. The cover plate 61C is made of transparent plastic, glass or the like, and hence a pointer 5 and a dead zone 41 of an area indicator 4 located inside are visible from the outside.

According to the fourth embodiment, the following advantages can be obtained in addition to the advantages (1) and (2) of the first embodiment.

(5) Since the cover plate 61C of the bezel 6C has the graduations 63C and thus serves as a dial face, the dial face and the cover plate can be formed as one component, thereby reducing the number of components. Further, since the cover plate 61C is made of transparent material not to hide the dead zone 41 of the area indicator 4, measurement errors due to mistakes in reading the graduations can be prevented.

The present invention is not limited to the above-described embodiments, but includes modifications and improvements as long as objects of the present invention can be achieved.

For example, in the first embodiment, the dial face 3 is fixed to the inner wall of the bezel 6 by caulking, but the configuration is not limited thereto. That is, as long as the dial face 3 is attached to the bezel 6 and fixed, any method may be used for fixing it. For instance, if a positioning portion is formed on the bezel 6, the dial face 3 may be fixed thereto by bonding or with a screw.

In the first embodiment, the dial face 3 and the area indicator 4 are made of metal such as stainless steel, but it may be made of other materials. For example, the dial face 3 and the area indicator 4 may be made of synthetic resin, ceramics or the like other than metal. However, since materials such as synthetic resin with thermoplasticity may be deformed if used under high temperature, graduations become incorrect. For this reason, the material should be selected depending on use conditions.

In the second embodiment, the material used for the dead zone 41A of the area indicator 4A is not specified, but it may be translucent synthetic resin or the like or may be metal material. If a translucent film with transparency is used, the dead zone 41A can cover the upper surface of the dial face without troublesome processing required in the case of metal. However, if the materials with thermoplasticity described above are used, the dead zone cannot indicate the correct area due to deformation. For this reason, the material should be selected depending on use conditions.

In the first embodiment, the area indicator 4 is a substantially rectangular thin plate, but it may have a different shape. As long as the area indicator 4 can be attached to the base plate 12 of the gauge body 10 and has a size to clearly show the dead zone 41, the shape and the size are not limited. For instance, an area indicator having a circular shape to cover the base plate 12 or the one having only the size of the dead zone may be applicable.

In the first and second embodiments, the area indicator 4 is positioned under the dial face 3, but the position is not limited thereto. For example, if a cylinder having a diameter larger than the pointer shaft 11 and being fixed to the base plate 12 is provided around the pointer shaft 11 and an area indicator made of transparent material is fixed to the tip of the cylinder, the area indicator may be positioned over the dial face. Alternatively, only the dead zone may be fixed to the cylinder. That is, as long as the dead zone 41 is fixed to the dial face 3 and a relative position of the dead zone 41 and the gauge body 10 is unchanged, the positional relationship between the dial face 3 and the area indicator 4 is not limited.

In the fourth embodiment, the dial face 3 is substituted by the graduations formed on the cover plate 61C. Similarly, if the dead zone is formed directly on the base plate, the area indicator 4 may be substituted by this dead zone. In this case, the dial face 3 must be made of transparent material. Forming the graduations on the cover plate 61C and the dead zone on the base plate 12 can further reduce the number of components.

In each of the embodiments of the present invention, the dial gauge is cited as an example of the dial-display measuring tool, but the tool is not limited thereto. For instance, it may be a micrometer equipped with a dial gauge that can measure the outer diameter of a workpiece with high accuracy, or may be a dial depth gauge that is a depth gauge for measuring the height or the depth of a workpiece using a dial display. That is, any dial-display measuring tools are applicable as long as a displacement of a contact point or a measurement value read by the contact point etc. is converted to a rotation amount and a pointer points the measurement value in response to the rotation amount.

The best configurations and methods are disclosed in the above description, but the present invention is not limited thereto. In other words, while the present invention has been described with reference to specific embodiments and drawing thereof, various modifications in shapes, materials, quantity and other configuration details may be made to the disclosed embodiments by those of ordinary skill in the art without departing from the spirit and scope of the invention. Since the description limiting to the shapes and the materials disclosed above is intended to be illustrative for easier understanding and not to be limiting the invention, the present invention includes descriptions of materials without all or a part of the limitation of the shapes and the material.

What is claimed is:

1. A dial-display measuring tool comprising:
    a gauge body;
    a probe attached to the gauge body;
    a pointer that points a measurement value in response to a movement of the probe and is attached to the gauge body;
    a dial face showing graduations of measurement values; and
    an area indicator indicating a predetermined range of the graduations,
    wherein the dial face and the area indicator are independently turnable and separately formed.

2. The dial-display measuring tool according to claim 1, wherein a bezel is turnably attached to the gauge body, wherein the dial face is attached to the bezel, and wherein the area indicator is attached to the gauge body.

3. The dial-display measuring tool according to claim 2, wherein a view hole is formed substantially at the center of the dial face to show an approximate center of the area indicator therethrough, and
    wherein an edge of the area indicator is extended across a rim of the view hole to cover a part of a surface of the dial face.

4. The dial-display measuring tool according to claim 2, wherein the dial face is made of transparent material.

5. The dial-display measuring tool according to claim 2, wherein the dial face is a transparent cover plate provided on an upper surface of the bezel.

6. The dial-display measuring tool according to claim 1, wherein the dial-display measuring tool is a one-revolution dial gauge comprising: the gauge body; the probe; the pointer; the dial face; and the area indicator, and
    wherein a dead zone indicating an area where measurement accuracy is not assured is shown on the area indicator.

* * * * *